(12) United States Patent
Lin et al.

(10) Patent No.: US 9,823,110 B2
(45) Date of Patent: Nov. 21, 2017

(54) RADAR LIQUID LEVEL MEASURING APPARATUS AND RADAR LIQUID LEVEL MEASURING METHOD

(71) Applicant: FINETEK Co., Ltd., New Taipei (TW)

(72) Inventors: I-Chu Lin, New Taipei (TW); Liang-Chi Chang, New Taipei (TW); Cheng-Huang Wu, New Taipei (TW); Chao-Kai Cheng, New Taipei (TW); Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 114 days.

(21) Appl. No.: 14/809,975

(22) Filed: Jul. 27, 2015

(65) Prior Publication Data

US 2017/0030761 A1   Feb. 2, 2017

(51) Int. Cl.
G01F 23/284 (2006.01)

(52) U.S. Cl.
CPC .................. G01F 23/284 (2013.01)

(58) Field of Classification Search
CPC .................................................. G01F 23/284
See application file for complete search history.

(56) References Cited

U.S. PATENT DOCUMENTS

| | | | | |
|---|---|---|---|---|
| 3,764,999 A * | 10/1973 | Simons | ...................... | G01S 7/38 342/15 |
| 6,628,229 B1 * | 9/2003 | Johnson | ................ | G01F 23/284 342/124 |
| 2009/0027255 A1 * | 1/2009 | Stove | .................. | G01S 13/5246 342/93 |

FOREIGN PATENT DOCUMENTS

| | | |
|---|---|---|
| DE | 10393009 T5 | 9/2005 |
| DE | 102005049500 A1 | 5/2007 |

OTHER PUBLICATIONS

Office Action dated Jun. 20, 2016 of the Corresponding German Patent Application No. 102015113405.5.

* cited by examiner

Primary Examiner — Laura Martin
Assistant Examiner — Alex Devito
(74) Attorney, Agent, or Firm — Chung-Ming Shih; HDLS IPR Services

(57) ABSTRACT

A radar liquid level measuring apparatus (10) includes a first oscillation module (102), a second oscillation module (104), a frequency comparator (106) and a control module (107). The first oscillation module (102) has a first oscillation frequency. The first oscillation module (102) generates a first pulse signal (10202). The second oscillation module (104) has a second oscillation frequency. The second oscillation module (104) generates a second pulse signal (10402). The frequency comparator (106) converts the first pulse signal (10202) and the second pulse signal (10402) into an adjusted signal (10602). The control module (107) compares the adjusted signal (10602) with an expectation value (10818) to obtain a comparative result signal. According to the comparative result signal, the control module (107) adjusts the second oscillation frequency, so that the second oscillation frequency and the first oscillation frequency have a constant frequency difference.

5 Claims, 3 Drawing Sheets

RADAR LIQUID LEVEL MEASURING APPARATUS AND RADAR LIQUID LEVEL MEASURING METHOD

BACKGROUND OF THE INVENTION

Field of the Invention

The present invention relates to a measuring apparatus and a measuring method, and especially relates to a radar liquid level measuring apparatus and a radar liquid level measuring method.

Description of the Related Art

Currently, the disadvantage of the radar liquid level measuring apparatus is that the radar liquid level measuring apparatus is affected by the measurement environment easily. When the measurement environment changes violently, for example, when the temperature of the measurement environment changes violently, the radar liquid level measuring apparatus cannot maintain high accuracy. The accuracy of the radar liquid level measuring apparatus is affected by the temperature of the measurement environment easily. The function of the radar liquid level measuring apparatus is affected by the temperature of the measurement environment easily as well, so that the function of the radar liquid level measuring apparatus is abnormal. This is because the difference between two frequencies of the radar liquid level measuring apparatus is changed according to the change of the temperature. Therefore, the radar liquid level measuring apparatus cannot maintain high accuracy.

SUMMARY OF THE INVENTION

In order to solve the above-mentioned problems, an object of the present invention is to provide a radar liquid level measuring apparatus.

In order to solve the above-mentioned problems, another object of the present invention is to provide a radar liquid level measuring method.

In order to achieve the object of the present invention mentioned above, the radar liquid level measuring apparatus comprises a first oscillation module, a second oscillation module, a frequency comparator and a control module. The first oscillation module has a first oscillation frequency. The first oscillation module generates a first pulse signal according to the first oscillation frequency. The second oscillation module has a second oscillation frequency. The second oscillation module generates a second pulse signal according to the second oscillation frequency. The frequency comparator is electrically connected to the first oscillation module and the second oscillation module. The control module has an expectation value. The control module is electrically connected to the second oscillation module and the frequency comparator. The first oscillation module sends the first pulse signal to the frequency comparator. The second oscillation module sends the second pulse signal to the frequency comparator. The frequency comparator converts the first pulse signal and the second pulse signal into an adjusted signal. The frequency comparator sends the adjusted signal to the control module. The control module compares the adjusted signal with the expectation value to obtain a comparative result signal. According to the comparative result signal, the control module adjusts the second oscillation frequency, so that the second oscillation frequency and the first oscillation frequency have a constant frequency difference.

In order to achieve another object of the present invention mentioned above, the radar liquid level measuring method comprises following steps. A first pulse signal with a constant oscillation frequency is generated. A second pulse signal with an adjustable oscillation frequency is generated. A frequency comparator is used to convert the first pulse signal and the second pulse signal into an adjusted signal. The frequency comparator sends the adjusted signal to a control module. The control module compares the adjusted signal with an expectation value to obtain a comparative result signal. According to the comparative result signal, the control module adjusts the adjustable oscillation frequency of the second pulse signal, so that the adjustable oscillation frequency of the second pulse signal and the constant oscillation frequency of the first pulse signal have a constant frequency difference.

The advantage of the present invention is that the radar liquid level measuring apparatus can still maintain high accuracy and the function of the radar liquid level measuring apparatus is normal even if the measurement environment changes violently.

DETAILED DESCRIPTION OF THE INVENTION

Please refer to following detailed description and figures for the technical content of the present invention. The following detailed description and figures are referred for the present invention, but the present invention is not limited to it.

Figure 1:
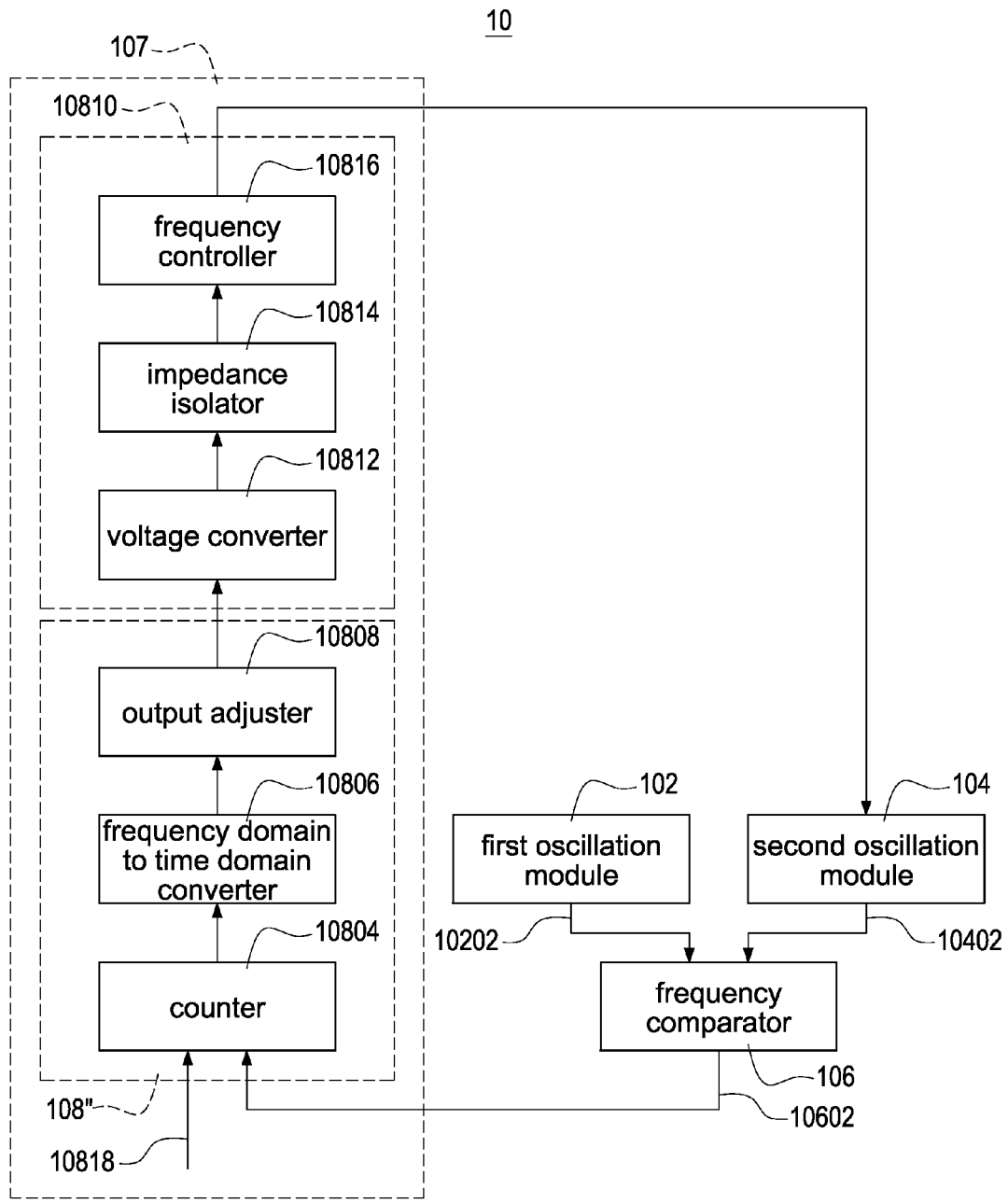
FIG. 1 shows a block diagram of one part of the radar liquid level measuring apparatus of the present invention.

FIG. 1 shows a block diagram of one part of the radar liquid level measuring apparatus of the present invention. A radar liquid level measuring apparatus 10 comprises a first oscillation module 102, a second oscillation module 104, a frequency comparator 106 and a control module 107. The control module 107 comprises a control unit 108 and a frequency fine-tuning unit 10810. The control unit 108 comprises a counter 10804, a frequency domain to time domain converter 10806 and an output adjuster 10808. The frequency fine-tuning unit 10810 comprises a voltage converter 10812, an impedance isolator 10814 and a frequency controller 10816.

The frequency comparator 106 is electrically connected to the first oscillation module 102 and the second oscillation module 104. The control unit 108 is electrically connected to the second oscillation module 104 and the frequency comparator 106. The counter 10804 is electrically connected to the frequency comparator 106. The frequency domain to time domain converter 10806 is electrically connected to the counter 10804. The output adjuster 10808 is electrically connected to the frequency domain to time domain converter 10806. The frequency fine-tuning unit 10810 is electrically connected to the output adjuster 10808 and the second oscillation module 104. The voltage converter 10812 is electrically connected to the output adjuster 10808. The impedance isolator 10814 is electrically connected to the voltage converter 10812. The frequency controller 10816 is electrically connected to the impedance isolator 10814 and the second oscillation module 104.

Moreover, in the embodiment, the frequency comparator 106 can be, for example but not limited to, a D-type flip-flop.

The first oscillation module 102 has a first oscillation frequency. The first oscillation module 102 generates a first pulse signal 10202 according to the first oscillation frequency. The first oscillation module 102 sends the first pulse signal 10202 to the frequency comparator 106. The second oscillation module 104 has a second oscillation frequency. The second oscillation module 104 generates a second pulse signal 10402 according to the second oscillation frequency. The second oscillation module 104 sends the second pulse signal 10402 to the frequency comparator 106.

The frequency comparator 106 converts the first pulse signal 10202 and the second pulse signal 10402 into an adjusted signal 10602. The frequency comparator 106 sends the adjusted signal 10602 to the control module 107. The control module 107 has an expectation value 10818. The control module 107 compares the adjusted signal 10602 with the expectation value 10818 to obtain a comparative result signal. According to the comparative result signal, the control module 107 adjusts the second oscillation frequency (for example, adjusts the second oscillation frequency by the frequency fine-tuning unit 10810), so that the second oscillation frequency and the first oscillation frequency have a constant frequency difference (namely, the constant frequency difference is between the second oscillation frequency and the first oscillation frequency; the second oscillation frequency minus the first oscillation frequency is the constant frequency difference, or the first oscillation frequency minus the second oscillation frequency is the constant frequency difference).

The operation principle of the expectation value 10818 is as following. The control module 107 comprises the control unit 108 and the frequency fine-tuning unit 10810. The adjusted signal 10602 is a plurality of pulse signals. The expectation value 10818 is a predetermined value sent from an external system (not shown in FIG. 1) to the control unit 108 by the user. The counter 10804 sends the comparative result signal to the frequency domain to time domain converter 10806 after the counter 10804 counts a number of the adjusted signal 10602 received by the counter 10804. At this time, the comparative result signal is a frequency domain signal. Therefore, the frequency domain to time domain converter 10806 converts the comparative result signal into a time domain signal and sends the time domain signal to the output adjuster 10808. After the output adjuster 10808 receives the time domain signal, in accordance with the time domain signal, the output adjuster 10808 outputs a control voltage signal with a duty cycle to the voltage converter 10812. After the voltage converter 10812 receives the control voltage signal, the voltage converter 10812 sends a driving voltage signal to the frequency controller 10816 through the impedance isolator 10814. According to the driving voltage signal, the frequency controller 10816 outputs a constant voltage signal to the second oscillation module 104. According to the constant voltage signal received by the second oscillation module 104, the second oscillation module 104 adjusts the second oscillation frequency.

Moreover, the control voltage signal outputted from the output adjuster 10808 can be, for example, a voltage signal with the duty cycle. The control voltage signal and the number of the adjusted signal 10602 received by the counter 10804 have an inverse relationship. If the number of the adjusted signal 10602 received by the counter 10804 is greater than the expectation value 10818, the output adjuster 10808 outputs the control voltage signal with a lower duty cycle (for example, 30% turning on) to the frequency fine-tuning unit 10810, so that the frequency fine-tuning unit 10810 outputs a lower constant voltage signal to decrease the second oscillation frequency of the second oscillation module 104. If the number of the adjusted signal 10602 received by the counter 10804 is not greater than the expectation value 10818, the output adjuster 10808 outputs the control voltage signal with a higher duty cycle (for example, 60% turning on) to the frequency fine-tuning unit 10810, so that the frequency fine-tuning unit 10810 outputs a higher constant voltage signal to increase the second oscillation frequency of the second oscillation module 104. Moreover, the higher duty cycle is higher than the lower duty cycle. The higher constant voltage signal is higher than the lower constant voltage signal.

Moreover, the voltage converter 10812 is, for example but not limited to, a voltage integrating circuit. According to an impedance isolation of the impedance isolator 10814, the driving voltage signal is transmitted smoothly, so that the driving voltage signal avoids frequency interferences and the constant voltage signal outputted from the frequency controller 10816 is correct.

Moreover, the counter 10804, the frequency domain to time domain converter 10806, the output adjuster 10808 and the other components in the control unit 108 can be hardware circuits or software. The electrical connections mentioned in the present invention are electrical connections between electronic circuits for hardware circuits, and are data transmissions between the computer computation modules for software.

The constant frequency difference is a constant value, for example but not limited to 22 Hz. In an embodiment, the first oscillation frequency and the constant frequency difference is the second oscillation frequency. In an embodiment applied to the present invention, the temperature of the measurement environment increases from 25 degrees Celsius to 90 degrees Celsius. In the temperature range, the radar liquid level measuring apparatus 10 can still maintain high accuracy and the function of the radar liquid level measuring apparatus 10 is normal. Then the temperature of the measurement environment decreases from 90 degrees Celsius to 25 degrees Celsius. In the temperature range, the radar liquid level measuring apparatus 10 can still maintain high accuracy and the function of the radar liquid level measuring apparatus 10 is normal.

Figure 3:
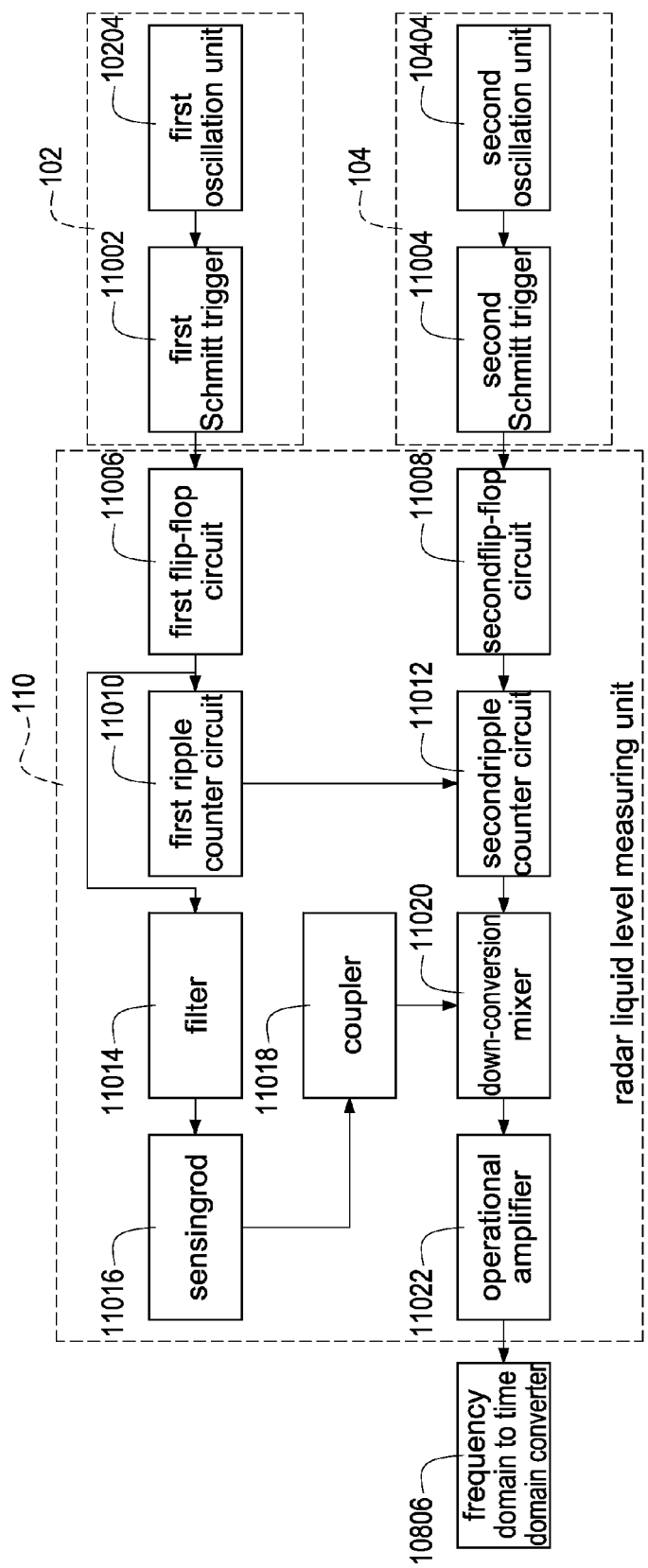
FIG. 3 shows a block diagram of another part of the radar liquid level measuring apparatus of the present invention.

FIG. 3 shows a block diagram of another part of the radar liquid level measuring apparatus of the present invention. The radar liquid level measuring apparatus 10 further comprises a radar liquid level measuring unit 110 electrically connected to the first oscillation module 102, the second oscillation module 104 and the frequency domain to time domain converter 10806. The first oscillation module 102 comprises a first oscillation unit 10204 and a first Schmitt trigger 11002. The second oscillation module 104 comprises a second oscillation unit 10404 and a second Schmitt trigger 11004.

The radar liquid level measuring unit 110 comprises a first flip-flop circuit 11006, a second flip-flop circuit 11008, a first ripple counter circuit 11010, a second ripple counter circuit 11012, a filter 11014, a sensing rod 11016, a coupler 11018, a down-conversion mixer 11020 and an operational amplifier 11022.

The first Schmitt trigger 11002 is electrically connected to the first oscillation unit 10204. The second Schmitt trigger 11004 is electrically connected to the second oscillation unit 10404. The first flip-flop circuit 11006 is electrically connected to the first Schmitt trigger 11002. The second flip-flop circuit 11008 is electrically connected to the second Schmitt trigger 11004. The first ripple counter circuit 11010 is electrically connected to the first flip-flop circuit 11006. The second ripple counter circuit 11012 is electrically connected to the second flip-flop circuit 11008 and the first ripple counter circuit 11010. The filter 11014 is electrically connected to the first ripple counter circuit 11010 and the first flip-flop circuit 11006. The sensing rod 11016 is electrically connected to the filter 11014. The coupler 11018 is electrically connected to the sensing rod 11016. The down-conversion mixer 11020 is electrically connected to the coupler 11018 and the second ripple counter circuit 11012. The operational amplifier 11022 is electrically connected to the down-conversion mixer 11020 and the frequency domain to time domain converter 10806 of the control unit 108.

The first Schmitt trigger 11002 and the second Schmitt trigger 11004 convert sine waves outputted from the first oscillation unit 10204 and the second oscillation unit 10404 into square waves. The first flip-flop circuit 11006 and the second flip-flop circuit 11008 narrow down the square waves (namely, increase frequencies of the square waves). When the first ripple counter circuit 11010 receives a certain number of the square waves, the first ripple counter circuit 11010 informs the second ripple counter circuit 11012, so that the square waves of the second ripple counter circuit 11012 return to the constant frequency difference which is the constant value (for example, 22 Hz) in a next cycle.

The square waves sent from the first flip-flop circuit 11006 are sent to the sensing rod 11016 through the filter 11014 for radar liquid level measuring. After the sensing rod 11016 receives spring-back waves, the spring-back waves are sent from the sensing rod 11016 to the down-conversion mixer 11020 through the coupler 11018 to be down-converted and mixed with the square waves sent from the second ripple counter circuit 11012 to obtain a down-conversion mixed signal. Then the down-conversion mixed signal is sent from the down-conversion mixer 11020 to the operational amplifier 11022 to be amplified to obtain an amplified signal. Then the operational amplifier 11022 sends the amplified signal to the control unit 108 (through the frequency domain to time domain converter 10806) for height calculation of liquid level.

Figure 2:
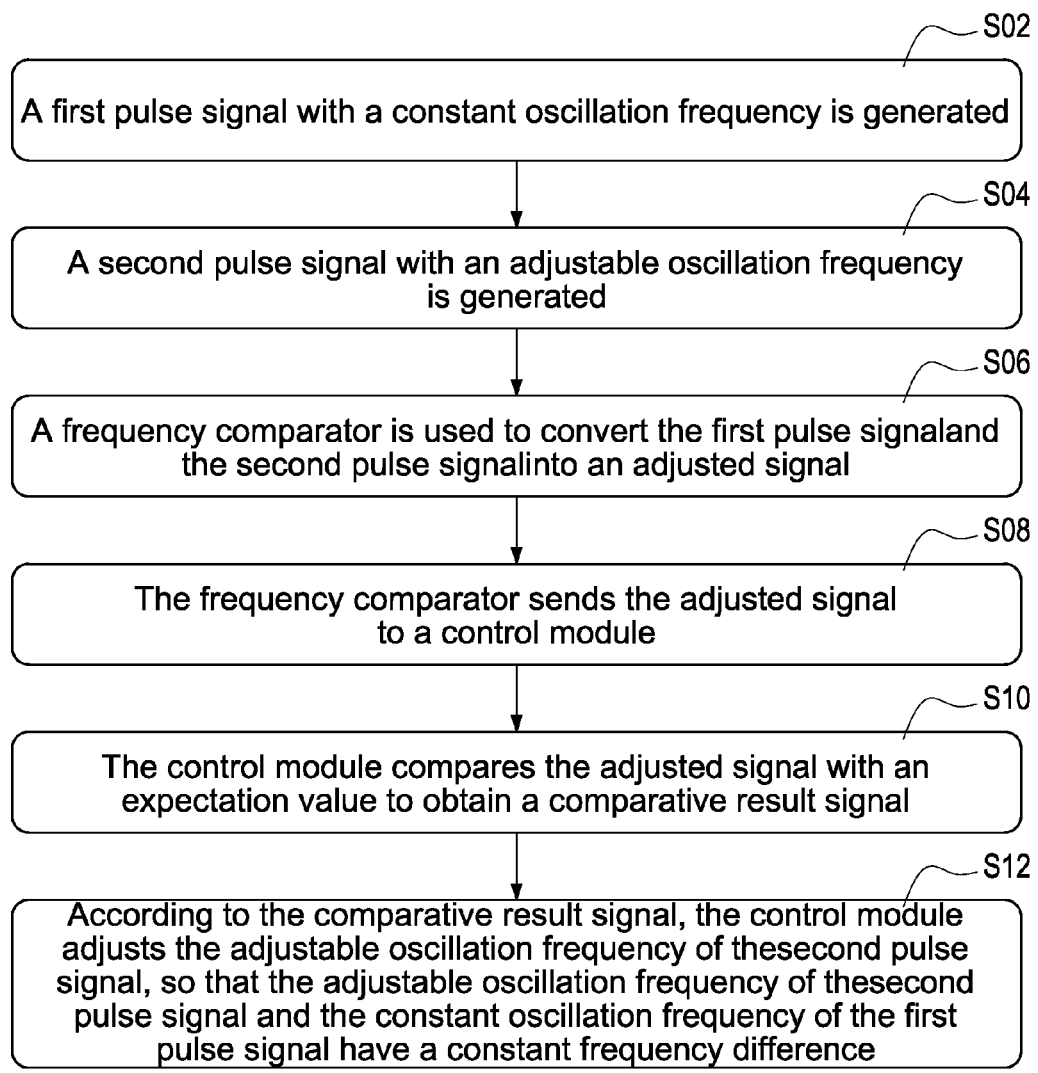
FIG. 2 shows a flow chart of the radar liquid level measuring method of the present invention.

FIG. 2 shows a flow chart of the radar liquid level measuring method of the present invention. A radar liquid level measuring method comprises following steps.

S02: A first pulse signal with a constant oscillation frequency is generated.

S04: A second pulse signal with an adjustable oscillation frequency is generated.

S06: A frequency comparator is used to convert the first pulse signal and the second pulse signal into an adjusted signal.

S08: The frequency comparator sends the adjusted signal to a control module.

S10: The control module compares the adjusted signal with an expectation value to obtain a comparative result signal.

S12: According to the comparative result signal, the control module adjusts the adjustable oscillation frequency of the second pulse signal, so that the adjustable oscillation frequency of the second pulse signal and the constant oscillation frequency of the first pulse signal have a constant frequency difference.

The control module comprises a control unit and a frequency fine-tuning unit. The adjusted signal is a plurality of pulse signals. The control unit counts a number of the adjusted signal received by the control unit. If the number of the adjusted signal received by the control unit is greater than the expectation value, the control unit decreases the adjustable oscillation frequency by the frequency fine-tuning unit. If the number of the adjusted signal received by the control unit is not greater than the expectation value, the control unit increases the adjustable oscillation frequency by the frequency fine-tuning unit.

The other description for the radar liquid level measuring method of the present invention, which is similar to those shown in FIG. 1 or FIG. 3, is not repeated here for brevity.

The advantage of the present invention is that the radar liquid level measuring apparatus 10 can still maintain high accuracy and the function of the radar liquid level measuring apparatus 10 is normal even if the measurement environment changes violently. The main feature of the present invention is that no matter how the measurement environment changes, according to the feedback signal control technology, the second oscillation frequency and the first oscillation frequency (or, the adjustable oscillation frequency and the constant oscillation frequency) always have the constant frequency difference. Therefore, the radar liquid level measuring apparatus 10 can still maintain high accuracy and the function of the radar liquid level measuring apparatus 10 is normal even if the measurement environment changes violently.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A radar liquid level measuring apparatus (10) comprising:
a first oscillation module (102) having a first oscillation frequency and generating a first pulse signal (10202) according to the first oscillation frequency;
a second oscillation module (104) having a second oscillation frequency and generating a second pulse signal (10402) according to the second oscillation frequency;
a frequency comparator (106) electrically connected to the first oscillation module (102) and the second oscillation module (104); and
a control module (107) having an expectation value and electrically connected to the second oscillation module (104) and the frequency comparator (106),
wherein the first oscillation module (102) sends the first pulse signal (10202) to the frequency comparator (106); the second oscillation module (104) sends the second pulse signal (10402) to the frequency comparator (106); the frequency comparator (106) converts the first pulse signal (10202) and the second pulse signal (10402) into an adjusted signal (10602); the frequency comparator (106) sends the adjusted signal (10602) to the control module (107); the control module (107) compares the adjusted signal (10602) with the expectation value (10818) to obtain a comparative result signal; according to the comparative result signal, the control module (107) adjusts the second oscillation frequency, so that the second oscillation frequency and the first oscillation frequency have a constant frequency difference;

wherein the control module (107) comprises:
a control unit (108) electrically connected to the frequency comparator (106),
wherein the control unit (108) comprises:
a counter (10804) electrically connected to the frequency comparator (106);
a frequency domain to time domain converter (10806) electrically connected to the counter (10804); and
an output adjuster (10808) electrically connected to the frequency domain to time domain converter (10806);
wherein the control module (107) further comprises:
a frequency fine-tuning unit (10810) electrically connected to the output adjuster (10808) and the second oscillation module (104),
wherein the adjusted signal (10602) is a plurality of pulse signals; the counter (10804) counts a number of the adjusted signal (10602) received by the counter (10804) to obtain the comparative result signal; if the number of the adjusted signal (10602) received by the counter (10804) is greater than the expectation value (10818), the control unit (108) decreases the second oscillation frequency of the second oscillation module (104) by the frequency fine-tuning unit (10810); if the number of the adjusted signal (10602) received by the counter (10804) is not greater than the expectation value (10818), the control unit (108) increases the second oscillation frequency of the second oscillation module (104) by the frequency fine-tuning unit (10810);
wherein the frequency fine-tuning unit (10810) comprises:
a voltage converter (10812) electrically connected to the output adjuster (10808);
an impedance isolator (10814) electrically connected to the voltage converter (10812); and
a frequency controller (10816) electrically connected to the impedance isolator (10814) and the second oscillation module (104),
wherein the counter (10804) sends the comparative result signal to the frequency domain to time domain converter (10806) after the counter (10804) counts the number of the adjusted signal (10602) received by the counter (10804); the frequency domain to time domain converter (10806) converts the comparative result signal into a time domain signal and sends the time domain signal to the output adjuster (10808); after the output adjuster (10808) receives the time domain signal, the output adjuster (10808) outputs a control voltage signal with a duty cycle to the voltage converter (10812); after the voltage converter (10812) receives the control voltage signal, the voltage converter (10812) sends a driving voltage signal to the frequency controller (10816) through the impedance isolator (10814); according to the driving voltage signal, the frequency controller (10816) outputs a constant voltage signal to the second oscillation module (104); according to the constant voltage signal received by the second oscillation module (104), the second oscillation module (104) adjusts the second oscillation frequency.

2. The radar liquid level measuring apparatus (10) in claim 1, further comprising:
a radar liquid level measuring unit (110) electrically connected to the first oscillation module (102), the second oscillation module (104) and the frequency domain to time domain converter (10806),
wherein the first oscillation module (102) comprises a first oscillation unit (10204) and a first schmitt trigger (11002); the second oscillation module (104) comprises a second oscillation unit (10404) and a second schmitt trigger (11004); the first schmitt trigger (11002) is electrically connected to the first oscillation unit (10204); the second schmitt trigger (11004) is electrically connected to the second oscillation unit (10404).

3. The radar liquid level measuring apparatus (10) in claim 2, wherein the radar liquid level measuring unit (110) comprises:
a first flip-flop circuit (11006) electrically connected to the first schmitt trigger (11002); and
a second flip-flop circuit (11008) electrically connected to the second schmitt trigger (11004).

4. The radar liquid level measuring apparatus (10) in claim 3, wherein the radar liquid level measuring unit (110) further comprises:
a first ripple counter circuit (11010) electrically connected to the first flip-flop circuit (11006); and
a second ripple counter circuit (11012) electrically connected to the second flip-flop circuit (11008) and the first ripple counter circuit (11010),
wherein when the first ripple counter circuit (11010) receives a certain number of square waves, the first ripple counter circuit (11010) informs the second ripple counter circuit (11012), so that the square waves of the second ripple counter circuit (11012) return to the constant frequency difference in a next cycle; the constant frequency difference is a constant value.

5. The radar liquid level measuring apparatus (10) in claim 4, wherein the radar liquid level measuring unit (110) further comprises:
a filter (11014) electrically connected to the first ripple counter circuit (11010) and the first flip-flop circuit (11006);
a sensing rod (11016) electrically connected to the filter (11014);
a coupler (11018) electrically connected to the sensing rod (11016);
a down-conversion mixer (11020) electrically connected to the coupler (11018) and the second ripple counter circuit (11012); and
an operational amplifier (11022) electrically connected to the down-conversion mixer (11020) and the frequency domain to time domain converter (10806).

* * * * *